United States Patent [19]

Shaw

[11] Patent Number: 4,975,930
[45] Date of Patent: Dec. 4, 1990

[54] DIGITAL PHASE LOCKED LOOP

[75] Inventor: Robert A. Shaw, Longmont, Colo.

[73] Assignee: Digital Equipment Corporation, Maynard, Mass.

[21] Appl. No.: 266,089

[22] Filed: Nov. 2, 1988

[51] Int. Cl.⁵ .............................................. H03D 3/24
[52] U.S. Cl. ..................................... 375/120; 307/269; 331/25
[58] Field of Search ...................... 375/80, 82, 83, 119, 375/120; 328/155, 72, 74; 331/1 R, 1 A; 360/51, 77; 307/269

[56] References Cited

U.S. PATENT DOCUMENTS

| | | | |
|---|---|---|---|
| 3,509,471 | 4/1970 | Puente | 328/55 |
| 3,947,634 | 3/1976 | Betts | 178/69.5 DC |
| 4,017,803 | 4/1977 | Baker | 329/104 |
| 4,210,776 | 7/1980 | VanMeter | 375/120 |
| 4,242,639 | 12/1980 | Boone | 328/155 |
| 4,259,740 | 3/1981 | Snell et al. | 375/99 |
| 4,357,707 | 11/1982 | Delury | 375/119 |
| 4,374,438 | 2/1983 | Crowley | 455/265 |
| 4,396,991 | 8/1983 | Baldwin et al. | 364/736 |
| 4,441,195 | 4/1984 | Baldwin et al. | 377/2 |
| 4,456,890 | 6/1984 | Carickhoff | 331/1 A |
| 4,462,110 | 7/1984 | Baldwin et al. | 377/43 |
| 4,472,686 | 9/1984 | Mishimura et al. | 375/120 |
| 4,513,429 | 4/1985 | Roeder | 375/120 |
| 4,519,086 | 5/1985 | Hull et al. | 375/120 |
| 4,563,657 | 1/1986 | Qureshi et al. | 331/25 |
| 4,574,243 | 3/1986 | Levine | 328/155 |
| 4,596,937 | 6/1986 | Johnson | 307/269 |
| 4,617,679 | 10/1986 | Brooks | 375/120 |
| 4,644,420 | 2/1987 | Buchan | 360/51 |
| 4,677,648 | 6/1987 | Zurfluh | 375/120 |
| 4,803,680 | 2/1989 | Rokugo et al. | 370/102 |
| 4,808,884 | 2/1989 | Hull et al. | 375/120 |

Primary Examiner—Douglas W. Olms
Assistant Examiner—Stephen Chin
Attorney, Agent, or Firm—Fish & Richardson

[57] ABSTRACT

A digital phase locked loop circuit produces a reference waveform synchronized with a sequence of read data signals by dividing the reference waveform which consists of 0's and 1's windows, into early and late regions for determining the occurrence of a read data pulse within a window. The occurrence of a data pulse during an early or a late region produces a corresponding phase error signal. The phase error signal controls the frequency of the reference signal by increasing or decreasing the periods of the early or late regions to synchronize the reference signal with the sequence of read data signals. A period table is addressed by a combination of reference signal timing and a frequency register whose output is modulated over several cycles.

20 Claims, 9 Drawing Sheets

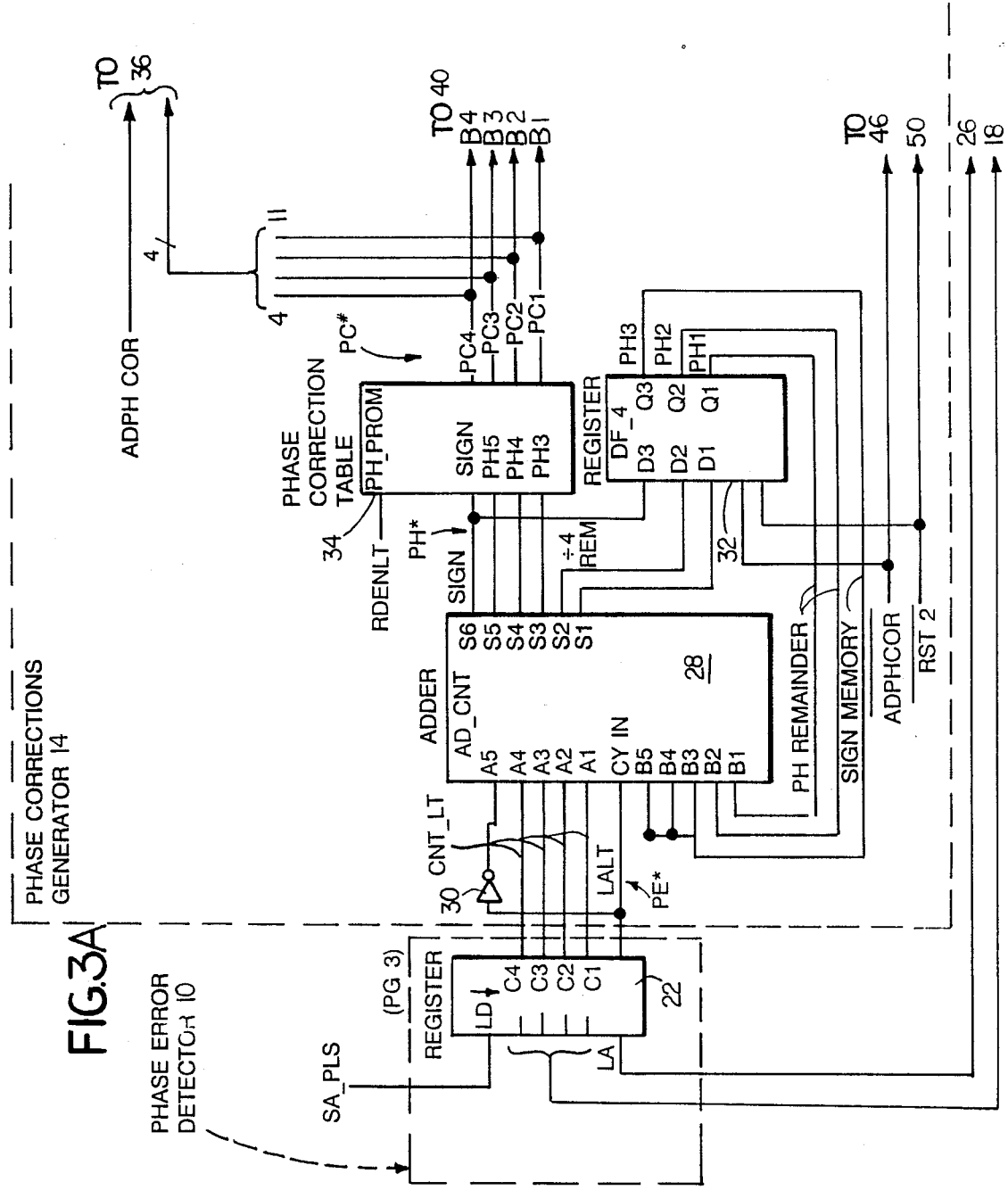

FIG.8

| F# | CY 2 | CY 1 | PDAD# (DROPPED) | | EQUIN F# | TOTAL CYCLES @48mHz | 4-CYCLE AVERAGE | EFFECTIVE FREQ(mHz) OVER 4 DATA CYCLES | DIFF |
|---|---|---|---|---|---|---|---|---|---|
| 12 | + | | 011 | 00 | | | | | |
| | 0 | 0 | 011 | 00 | 12 | 47 | | 0.9792 | |
| | 1 | 0 | 011 | 10 | 14 | 47 | $f_{av}$=47 | | |
| | 0 | 1 | 011 | 01 | 13 | 47 | | | |
| | 1 | 1 | 011 | 11 | 15 | 47 | | | .52 |
| 13 | + | | 011 | 01 | | | | | |
| | 0 | 0 | 011 | 01 | 13 | 47 | | 0.9844 | |
| | 1 | 0 | 011 | 11 | 15 | 47 | $f_{av}$=47.25 | | |
| | 0 | 1 | 011 | 10 | 14 | 47 | | | |
| | 1 | 1 | 100 | 00 | 16 | 48 | | | .52 |
| 14 | + | | 011 | 10 | | | | | |
| | 0 | 0 | 011 | 10 | 14 | 47 | | 0.9896 | |
| | 1 | 0 | 100 | 00 | 16 | 48 | $f_{av}$=47.50 | | |
| | 0 | 1 | 011 | 11 | 15 | 47 | | | |
| | 1 | 1 | 100 | 01 | 17 | 48 | | | .52 |
| 15 | + | | 011 | 11 | | | | | |
| | 0 | 0 | 011 | 11 | 15 | 47 | | | |
| | 1 | 0 | 100 | 01 | 17 | 48 | $f_{av}$=47.75 | | |
| | 0 | 1 | 100 | 00 | 16 | 48 | | 0.9948 | |
| | 1 | 1 | 100 | 10 | 18 | 48 | | | .52 |
| 16 | + | | 100 | 00 | | | | | |
| | 0 | 0 | 100 | 00 | 16 | 48 | | | |
| | 1 | 0 | 100 | 10 | 18 | 48 | $f_{av}$=48 | | |
| | 0 | 1 | 100 | 01 | 17 | 48 | | | |
| | 1 | 1 | 100 | 11 | 19 | 48 | | | |

DIGITAL PHASE LOCKED LOOP

BACKGROUND OF THE INVENTION

This invention relates to digital phase locked loops for locking a reference waveform providing 0's and 1's windows into synchronism with a sequence of binary data signals encoded according to a predetermined timing interval scheme.

The purpose of a phase locked loop (PLL) is to aid in the detection of data encoded in transmitted signals. The data in the transmitted signal is encoded as high frequency changes in the "carrier" frequency. Low frequency changes are not due to "data" but to such things as oscillator drift or, as in magnetic media recording, to disk or tape speed variations.

The output of the PLL is a reference signal that is synchronized in phase and frequency with the received data signal. The synchronization bandwidth is limited so that the reference signal tracks the lower frequency changes in the data signal but not the higher frequency changes. Due to this "tracking" at lower frequencies, differences between the data signal and the reference signal are due only to the high frequency changes in the data signal. It is the differences between these two signals which results as detected data.

Simply stated a phase locked loop is a high-pass filter allowing only high frequency variations in the carrier signal to be detected as data.

Digital information is typically recorded on magnetic media such as tape in an encoding format known as modified frequency modulation ("MFM") in which the binary value of the bit is indicated by the location of the magnetic indicia along a given track. A single bit is represented by a 0 window and an adjacent (e.g., subseguent) 1 window The 0 window is sometimes referred to as the clock cell and the 1 window as the data cell. The bit is either a 0 or a 1 depending on whether a magnetic pulse is detected in one corresponding time window or the other while the tape is running at constant speed. The reference waveform produced and governed by the PLL frames the alternating 1 and 0 windows used for recovering data recorded by MFM. By design, the read data (sensed magnetic pulses) fall timewise into the middle of one window or the other depending on their binary state.

Ideally, the magnetic pulses are recorded and read out perfectly so that they are centered exactly in the middle of the respective windows. However, there are a number of factors which degrade this precision. For example, variations in tape speed during either writing or reading or a nonuniformity in the media itself, can shift all of the subsequent data forward or backward slightly in time. This low frequency variability has to be accommodated in the reference signal or synchronization will be lost and subseguent data misread.

In an analog PLL design, a voltage controlled oscillator (VCO) is used to generate the reference signal. At any particular instance, the frequency of oscillation output by the VCO is determined by a control voltage. To change the frequency of oscillation the control voltage is changed to a higher or lower level. To change the phase of the reference signal in relation to the data signal the control voltage must be pulsed resulting in the oscillator either speeding up or slowing down (depending on the polarity of the pulse voltage) and then returning to the level at which the control voltage was before the pulse.

In the analog PLL design, detected phase errors between the reference signal and the data signal cause a current pulse to be generated by a "charge pump" with the pulse width determined by the phase time displacement between the two signals. (The magnitude of the current pulse is fixed but can be changed to change the gain of the loop.)

The current pulse passes to a resistor/capacitor circuit. The voltage across the resistor/capacitor circuit is applied to the VCO as the control voltage. The current pulse causes a voltage pulse across the resistor and a small change in the stored charge of the capacitor The voltage pulse across the resistor causes a phase change between the reference signal and the data signal and the change in the capacitor voltages adjusts the reference signal to match the frequency of the data signal.

The relationship between the charge pump current and the capacitor size determines the gain of the loop and the relationship of the resistor to the capacitor determines the step response of the loop.

With a multi track tape, each data channel requires its own PLL to synchronize a respective reference waveform. A PLL requiring analog elements is implemented in linear rather than digital integrated circuits. Given the present constraints on very large scale integrated circuits of the linear variety, multi-channel tape drives require many chips to implement high resolution PLL circuits.

SUMMARY OF THE INVENTION

The present invention permits implementation of a completely digital phase locked loop (DPLL), intended overall to be functionally equivalent to the prior PLL, but in which the above analog functions are done mathematically with numbers. In the embodiment of the invention described below, the voltage controlled oscillator in the analog circuit becomes a number (PDCN#) controlled oscillator in the digital circuit. The current pulse width of the charge pump is represented in the digital circuit by a sampled phase error number (PE#). The voltage pulse caused by the resistor in the analog circuit is a phase correction number (PC#) in the digital circuit and the voltage stored in the capacitor in the analog circuit corresponds to a frequency number (F#) stored in a register in the digital system. The ratio of the PC# to the P# determines the gain of the loop and the relationship of the PC# to the change that it causes in the F# determines the response of the loop.

A general feature of the invention, particularly, for digital recording applications, is a reference signal generator which times early and late periods of a data window, preferably by coupled digital counters, as a function of a lookup table addressed by a frequency register updated by a phase error detector which samples the condition of the reference signal in response to receipt of a read data signal. In the preferred embodiment of this feature, linked, early and late counters are alternately preloaded in each window, when the other timer rolls over, with numbers determinative of the number of clock cycles to be counted in a given early or late period of the window. The preload numbers come directly from a period table or from a logical combination of period and phase correction tables, the phase correction being preferably added to the preset for the applicable counter on a one-time-only basis.

In another general feature of the invention a preferably completely digital system is implemented by early and late counters preferably alternately preloaded with numbers reflective of a phase error determined between a reference signal whose timing is established by the counters and an incoming read data signal.

In another general feature of the invention, preferably an all digital implementation, the reference signal is sampled by a phase error detector which addresses a phase table. The timing for the reference signal is determined by a combination of outputs from the phase correction table and a separate period table. The presence of the phase correction table number in the combination is limited preferably to not more than one cycle.

Another general feature of the invention, preferably implemented digitally, is an addressing scheme for a period lookup table which feeds back the timing information for the early and late periods of reference signal windows to form at least part of the address to the period table. In addition, the preferred embodiment modulates another part of the address stored in a frequency register with an n cycle perturbation sequence. Preferably, a staggered series of integer increments between 0 and n is added to the frequency register in a repeating sequence. The result of this modulation, in the preferred embodiment, is to improve the frequency resolution by a factor of n over n cycles. The lookup table is preferably organized so that groups of n consecutive frequency register numbers correspond to a single unique period count sequence, the period count sequences for consecutive groups of period numbers being incremented by one clock count in a different nonadjacent period each time.

A significant advantage of this system is that it permits implementation in a purely digital circuit, which may be fabricated on a single chip, to achieve a high resolution phase locked loop. Phase corrections are controlled by phase and frequency control circuitry, both implemented digitally.

DESCRIPTION OF THE PREFERRED EMBODIMENTS

The drawings, are briefly described as follows:

FIG. 3A–3C are more detailed functional block diagram of the digital phase locked loop of FIG. 1 according to the invention.

FIG. 8 is a diagram illustrating the average frequencies produced by the frequency numbers 12 through 16 as modified by the CY1 and CY2 signal in the illustrated embodiment.

STRUCTURE

The embodiment of the invention described below is designed to provide a reference waveform for decoding digital data recorded on one channel of a magnetic tape in the MFM format. The data rate, that is, the rate at which bits are read from the moving tape, is assumed to be nominally 1 megahertz (MHz). The available clock frequency for running the DPLL is assumed to be 48 MHz. This would suggest that the finest increment available would be approximately 1/50th of the data rate, yielding a resolution of approximately 2%. One way of understanding this point is to consider that 48 consecutive clock pulses at 48 MHz span one cycle of the nominal 1 MHz data rate An arrangement of counters is used to construct a 48 clock cycle wide reference signal to track the nominal data rate. This reference signal can be increased or decreased by counting slightly different numbers of clock signals. The smallest possible change in either direction would be to add or drop one clock count. This would produce a reference signal which was either 49 or 47 clock cycles wide. In either case, the minimum percent change in the reference signal would be $1/48 \times 100$, or approximately 2%. The embodiment of the present invention allocates the counts (e.g., 48) in a data cycle to early and late regions within the 0's and 1's windows and modulates the collective number of counts in a data cycle in a way which achieves significantly higher effective resolution and accuracy.

Figure 1:
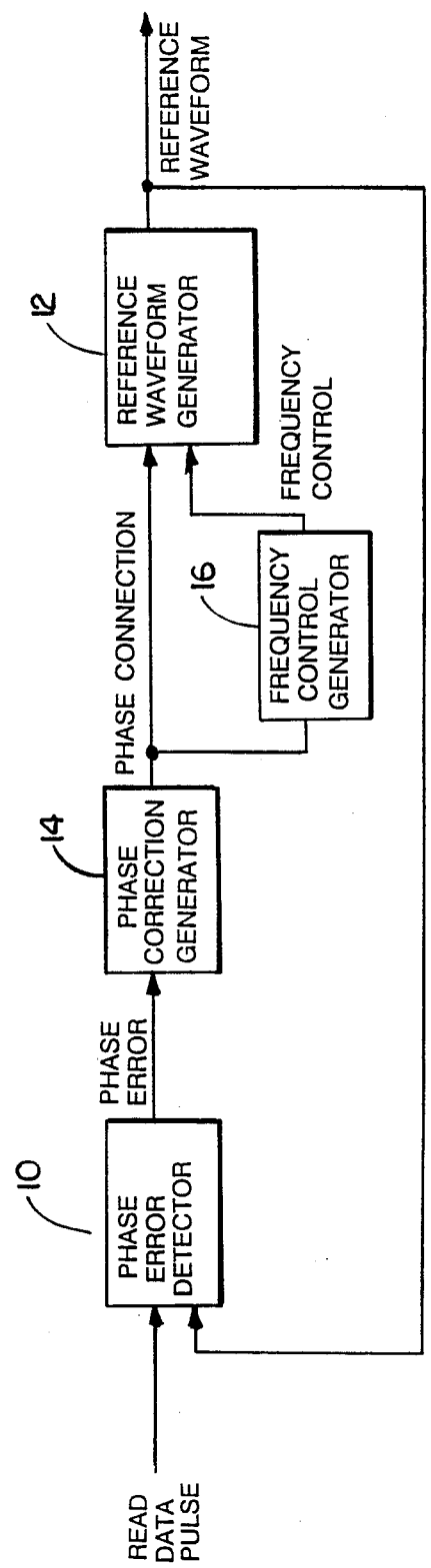
FIG. 1 is a block diagram of a digital phase locked loop according to the invention.

As shown in FIG. 1, the DPLL includes a phase error detector 10 which detects phase errors between the reference waveform produced by reference waveform generator 12 and input read data pulses from conventional tape reading circuitry Detected phase errors are passed to a phase correction generator 14 whose output is used for two purposes: to update a frequency correction generator 16 and to add a one-time phase correction or time shift to the reference waveform. Thus the outputs of the phase and frequency correction generators 14 and 16 are applied to the reference waveform generator 12 to adjust the timing of the reference waveform to keep it synchronized to the data currently being read from the magnetic tape.

Figure 2:
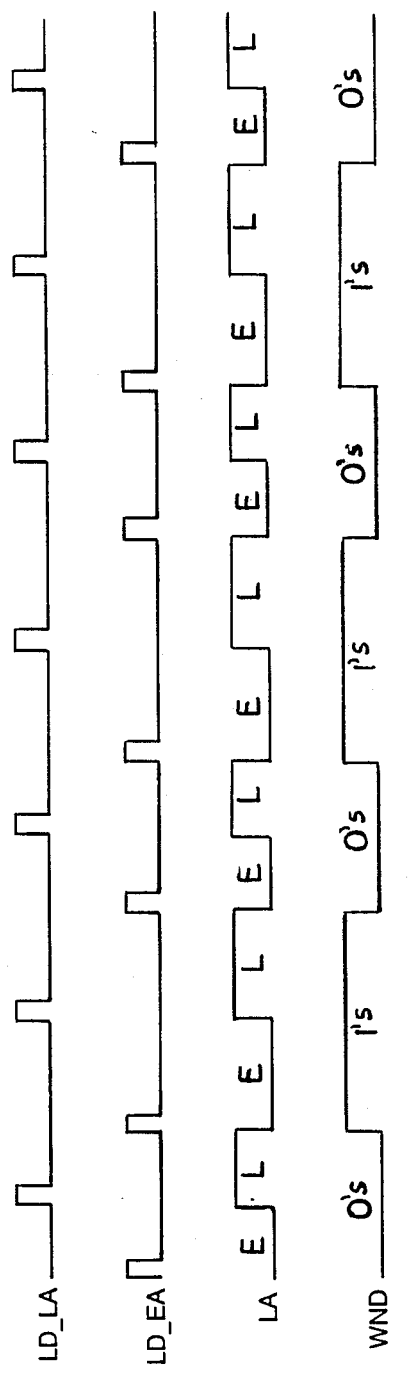
FIG. 2 is a timing diagram of the reference signals used to interpret data stored on a storage medium.

As shown in FIG. 2, the reference waveform WND is a series of 0's and 1's, each representing a window for decoding data. ("WND" stands for "window" or "1's window", the high condition of the signal). The direction or period of the 1's windows is generally larger than that of the 0's windows, and the combined periods of a 0 and a 1 window represent a single data cycle. If a data pulse occurs (i.e., is read) in the 0's window, the data is interpreted as a 0; if it occurs in the 1's window, the data is interpreted as a 1. In the event that no data pulse occurs in either half of the data cycle, then, according to the MFM protocol, data is interpreted as a 1.

The table in the appendix hereto serves as a reference glossary for the signal nomenclature in the illustrated embodiment.

The synchronism of the reference waveform is gauged by determining whether the data pulse occured early or late with respect to the center of a window The center of each window is determined by the transition of a late signal LA (FIG. 2) which divides each window into an early period E and a late period L. The late signal derives its name from the fact that the late period is high. A phase error is generated for every detected data pulse and corresponds to how early or how late the pulse occurred within the given window. This information is used to adjust subseguent windows so that subseguent data pulses will occur closer to the centers of their respective windows during ensuing data cycles.

Figure 3B:
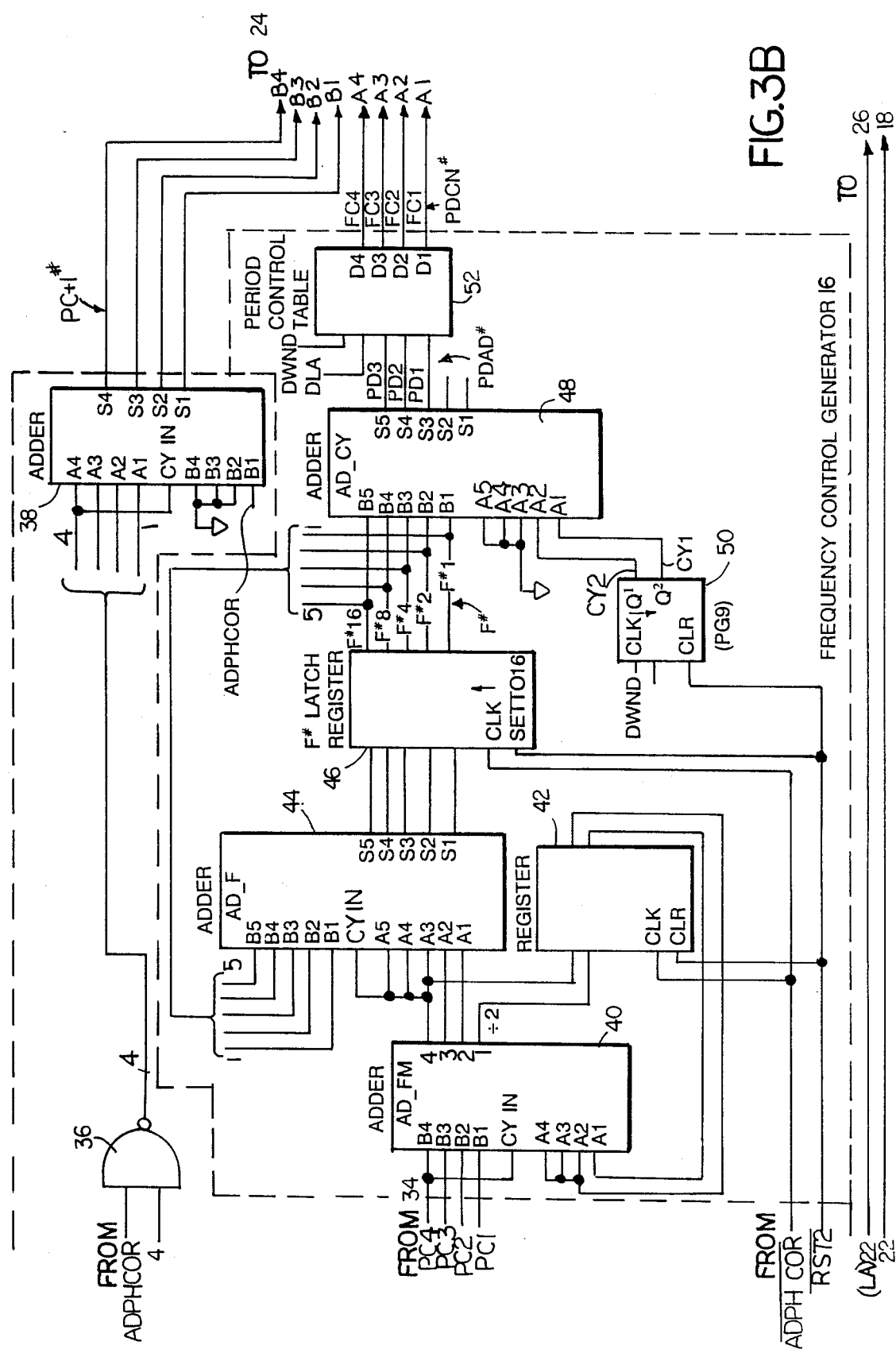
Figure 3C:
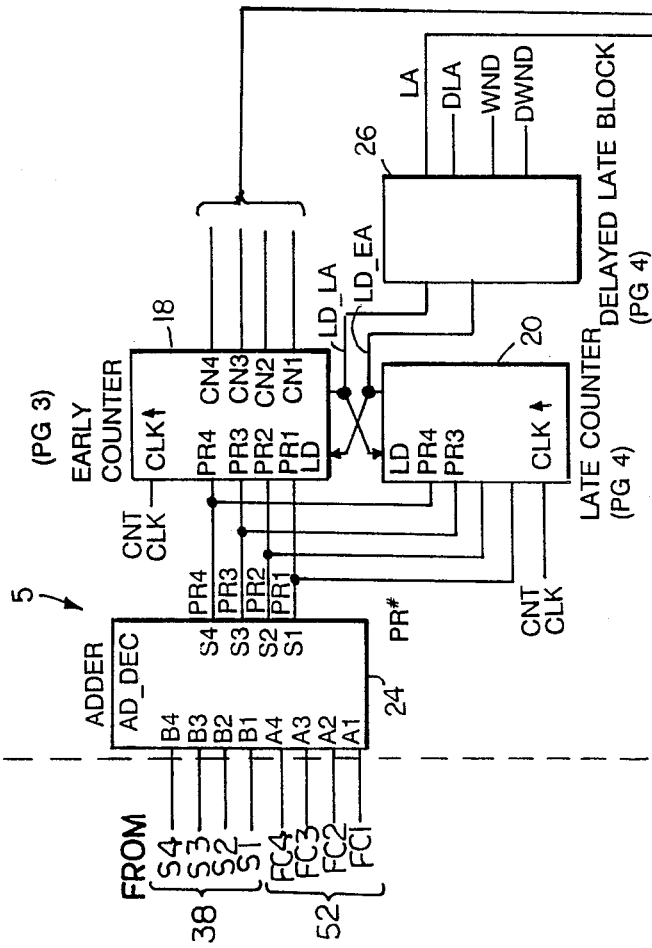

As shown in FIG. 3A–3C, the early and late periods are generated by early and late counters 18 and 20 in the reference waveform generator 12 Each counter is a four-bit up counter which counts from 0 to F (hexadecimal, hereinafter "hex") before rolling over to 0, which occasions an output pulse the carry output, which presets the other counter. Both counters are operated by a count clock CNT_CLK, which generates a square wave signal having a frequency that is a multiple of the bit rate of the raw data. In the preferred embodiment, the count clock is derived from the 48 MHz clock with a skip cycle that skips a clock cycle just before a sample pulse (SA_PLS) latches register 22 in phase error detector 10 (discussed below).

When the early counter 18 rolls over, a load late pulse LD_LA is generated by the counter 18 for loading a counter preset number PR# from a four-bit adder 24 into the late counter 20. The load late pulse LD_LA gates the late signal LA from which the reference waveform WND is derived via a delayed late block 26 consisting of a series of flip-flops (not shown). The delayed late block 26 also generates a delayed late signal DLA and a delayed window signal DWND which are nothing more than the late LA and window WND signals delayed by one 48 MHz clock pulse. Note that this delay is separate and apart from the SKIP signal and happens with or without a read data pulse. Thus WND and DWND are essentially the same signal as are LA and DLA and the delayed signals are not shown separately in the timing diagrams The delayed signals insure that the period control table outputs do not change until the end of LD_EA and LD_LA.

When late counter 20 rolls over, a load early pulse LD_EA is generated to load the early counter 18 with a new counter preset number PR# and disable the late signal LA. Thus LA is toggled by LD_LA and LD_EA. The timing diagram for these signals is shown in FIG. 2. It is this toggling back and forth between the early counter and the late counter that generates the waveform of the late signal LA to define the early and late periods of the windows. The duration of each period is controlled by the preset number PR# loaded in each counter and is determined by adding in the 4 bit adder 24, a one time phase correction number PC#, if applicable, to a period control number PDCN#, which is addressed for each segment of each window. The higher the preset number loaded into either counter, the closer the end of the count and thus, the shorter the clocked period required before the counter rolls over to zero.

Figure 4:
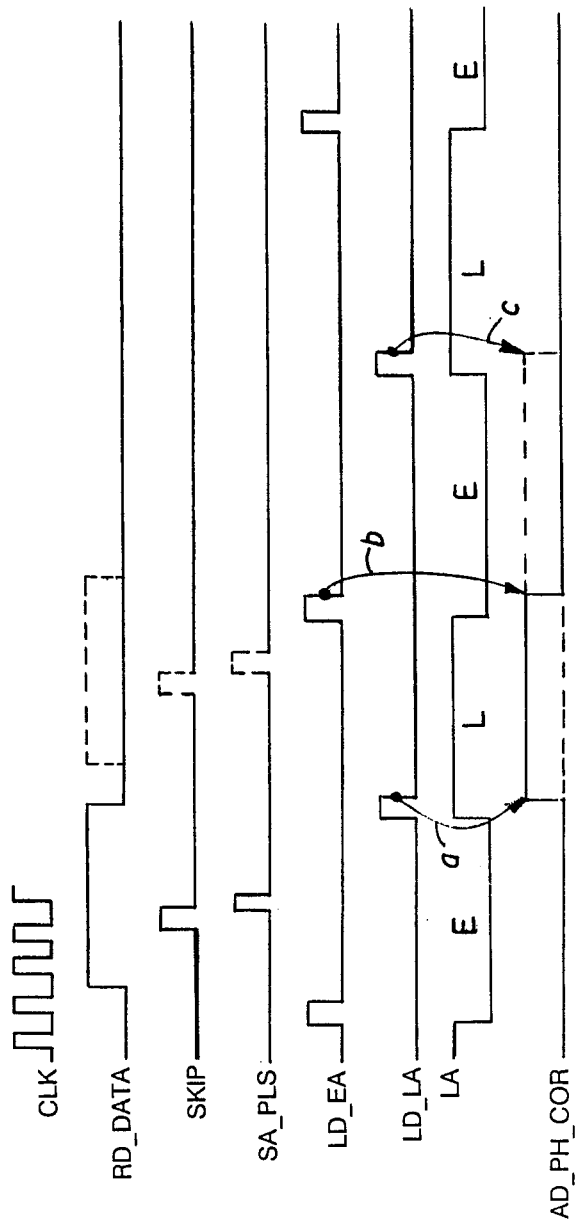
FIG. 4 is a timing diagram illustrating phase correction control.

The amount of phase error between the reference waveform and the input read data signal is determined by the phase error detector when a sample pulse SA_PLS causes register 22 to latch the output count of the early counter 18 and the late signal LA of the delayed late block. Referring to FIG. 4 in conjunction with FIG. 3, a read data signal RD_DATA (a logic signal responsive to pulse detection) generates two consecutive one clock cycle wide pulses, skip count (SKIP) and sample pulse (SA_PLS) and sets a latch which allows the add phase correction signal ADPHCOR to be generated on the next LD_LA or LD_EA signal, depending on whether the detected pulse occurred early or late respectively, the latter case being shown in phantom in FIG. 4. Skip count pulse SKIP is used to interrupt the counts 18 and 20 in the waveform generator 12 for one clock cycle to allow the early counter 18 to stabilize so that it can be accurately latched by register 22 in the phase error detector 10.

In the late period L (FIG. 4), following an early SA_PLS, an add phase correction signal ADPHCOR is generated using the skip and sample pulses together with the trailing edges of the load late LD_LA and load early LD_EA pulses as indicated by arrows a and b. The add phase correction signal ADPHCOR creates a period that allows signals to pass through the phase correction generator as well as the frequency control generator 16 (FIG. 1) for updating the next preset number PR# for the early counter 18. An add phase correction signal ADPHCOR (shown in phantom) is similarly generated when the skip and sample pulses occur during a late period as indicated by arrows b and c.

The count latched by the phase error register 22 (CNT_LT) together with the latched late signal (LA_LT forms the 5-bit phase error number PE#, which identifies where a data pulse occurred in the data cycle. For example, if the error register 22 latched an F count (hex), then the data pulse is considered early by one count. If the data pulse latches a zero count, then the data pulse was one clock pulse late thus, the latch count CNT_LT of the early counter 22 together with the late latch signal LA_LT indicates whether the data pulse was early or late and by how many clock pulses.

The phase error number PE# (i.e., the parallel output of register 22) is fed to the phase correction generator 14 for generating a single, one-time phase correction and for updating the frequency number. For example, if a data pulse occurs early, the phase correction generator 14 will generate a phase correction number PC# that will reduce the preset count number PR# loaded into the early counter for the next early period. This increases the time period for the next early period by requiring more clock counts for the early counter 18 to roll over. If the data pulse came in late, the count loaded into the late counter during the next late period is increased, thereby, shortening the time required for the late counter to roll over. The AIPHCOR signal always causes a one to be added to PC# at adder 38. This shortens the period and corrects for delay caused by the skip time.

The phase correction generator 14 includes a 5-bit adder 28 receiving the phase error number PE#. The count latch number CNT_LT is fed to corresponding input bits A1-A4. The late latch signal LA_LT is fed to the highest order input bit A5 via an inverter 30 and also directly fed into the carry input $CY_{IN}$. When the late latch signal LA_LT is high, one is added to the count latch number CNT_LT via $CY_{IN}$. This provides a late phase error signal for the case when the phase error register 22 latches 0000 (a count that is one clock pulse late). The inverted LA_LT signal into A5 of adder 28 acts as a sign bit for the negative early phase error numbers. (An early PE# of "F" represents a negative "1" or 1 early.)

The two lowest order output bits S1 and S2 of adder 28 are separated, which serves to divide the output of adder 28 by 4, and latched out by a register 32. The highest order output terminal S6 operates as a sign bit and is also latched by register 32 to preserve the sign of the lower order bits. During the next data cycle, the contents of register 32 serve as a phase remainder to be added (B1-B3) to the next count latch number CNT_LT. The divide-by-4 system minimizes the effect that an offset bit will have on the phase error of the next bit so that the phase correction will be only a fraction (¼) of the phase error detected. This prevents phase jitter from having an undue effect on the reference waveform. Similar measures inhibit the effect on frequency.

The remaining output bits S3, S4, S5, and S6 of adder 28 are fed to a phase table 34 and either pass through the table 34 to become a phase correction number PC#, if a read enable latch signal RD—EN—LT is low, or address a phase correction number PC# stored in the table. A sample lookup table is fully specified in Table 1:

TABLE 1

(Phase Correction Table)

| LATCHED RD EN-H = | | 0 | 1 | |
|---|---|---|---|---|
| PH Sign, 5, 4, 3 (In HEX) = | | | | |
| | 0 | 0 | 0 | Positive |
| | 1 | 1 | 1 | Late PC#s |
| | 2 | 2 | 1 | |
| | 3 | 3 | 1 | |
| | 4 | 4 | 2 | |
| | B | B | D | Negative Early PC#s |
| | C | C | E | |
| | D | D | E | |
| | E | E | E | |
| | F | F | F | |

Addresses 5-A, the missing center section of Table I, turned out to be unnecessary since phase error samples (PE#) can never be large enough to result in addressing this portion of the table.

The read enable latch signal RD—EN—LT is used to put the DPLL in a high gain mode used to initialize the system. It allows the system to quickly lock on to the speed of the tape. Once the system is locked on, the system can be switched to a low gain mode. For example, if a count of D (hex) (maximum possible) is latched by phase error register 22 during a late period and A3 is in the remainder latch 32, then a 0100 (including the carry in signal) is fed to the phase correction table 34. Referring to Table 1, then a 4, a large phase error, passes through the phase table 24 when the read enable latch RD—EN—LT is low. Otherwise, a smaller phase correction number PC# (2) is addressed when RD—EN—LT is high.

The phase correction number PC# is used for two purposes: to correct the phase error and to update the frequency number F#. In the first case, the inverted phase correction number PC# is gated through a NAND gate 36 to a 4-bit adder 38 when the add phase correction signal ADPHCOR goes high. Adder 38 adds 1 to the inverted phase correction number PC# to compensate for the cycle lost during SKIP. The phase correction signal is used to lower the count loaded into the early counter 18, if the data pulse occurred during an early period making the cycle longer. If the data pulse occurred during a late period, the phase correction signal raises the count loaded into the late counter 20 making the cycle shorter.

At the same time, the phase correction number PC# is fed from the phase correction table 34 to a 4 bit adder 40 in the frequency control generator 16. The least significant output bit S1 and the sign bit S4 are connected to a register 42. This operation divides the phase correction number PC# by 2. The latched count CNT—LT at this point has been divided by a total factor of 8 to reduce the responsiveness of the loop to avoid overly hasty frequency corrections based on a nonrecurring error. The three most significant output bits S2, S3, and S4 of adder 40 are added to the pre-existing frequency number F# by adder 44. The resulting updated frequency number F# is then latched by register 46. The output of frequency number latch 46 is 5 bits (0 to 31) with F# 16 indicating the nominal 1 MHz frequency. An adder 48 then sums the latched frequency number F# with the output of a 2-bit CY1-2 counter 50 which is clocked once every data cycle by the delayed window signal DWND. Note that CY1-2 counter 50 is connected to adder 48 in a manner that adds a staggered sequence of numbers (0, 2, 1, 3) to the frequency number F#. Reasons for staggering this count will be explained later. The three most significant output bits S3, S4, and S5 of adder 48 form a period number PD# that is used together with the delayed late signal DLA and the delayed window signal DWND to address a period control number PDCN# stored in the period control table 52. An illustrative lookup table is fully specified in Table 2:

TABLE 2

(Period Control Table)

| DWND (DLYED 1's WND-H) = | | 0 | 0 | 1 | 1 |
|---|---|---|---|---|---|
| DLA (DLYED LATE-H) = | | 0 | 1 | 0 | 1 |
| PDAD# = | 0 | 8 | 4 | 5 | 7 |
| | 1 | 7 | 4 | 5 | 7 |
| | 2 | 7 | 4 | 4 | 7 |
| | 3 | 7 | 4 | 4 | 6 |
| | 4 | 7 | 3 | 4 | 6 |
| | 5 | 6 | 3 | 4 | 6 |
| | 6 | 6 | 3 | 3 | 6 |
| | 7 | 6 | 3 | 3 | 5 |

The modified phase correction number PC# is then added to the period control number PDCN# in the 4-bit adder 24 in the reference waveform generator 12 to produce the preset numbers PR# for determining the preloads for the early and late counters to establish the early or late windows of the reference waveform WND.

Figure 5:
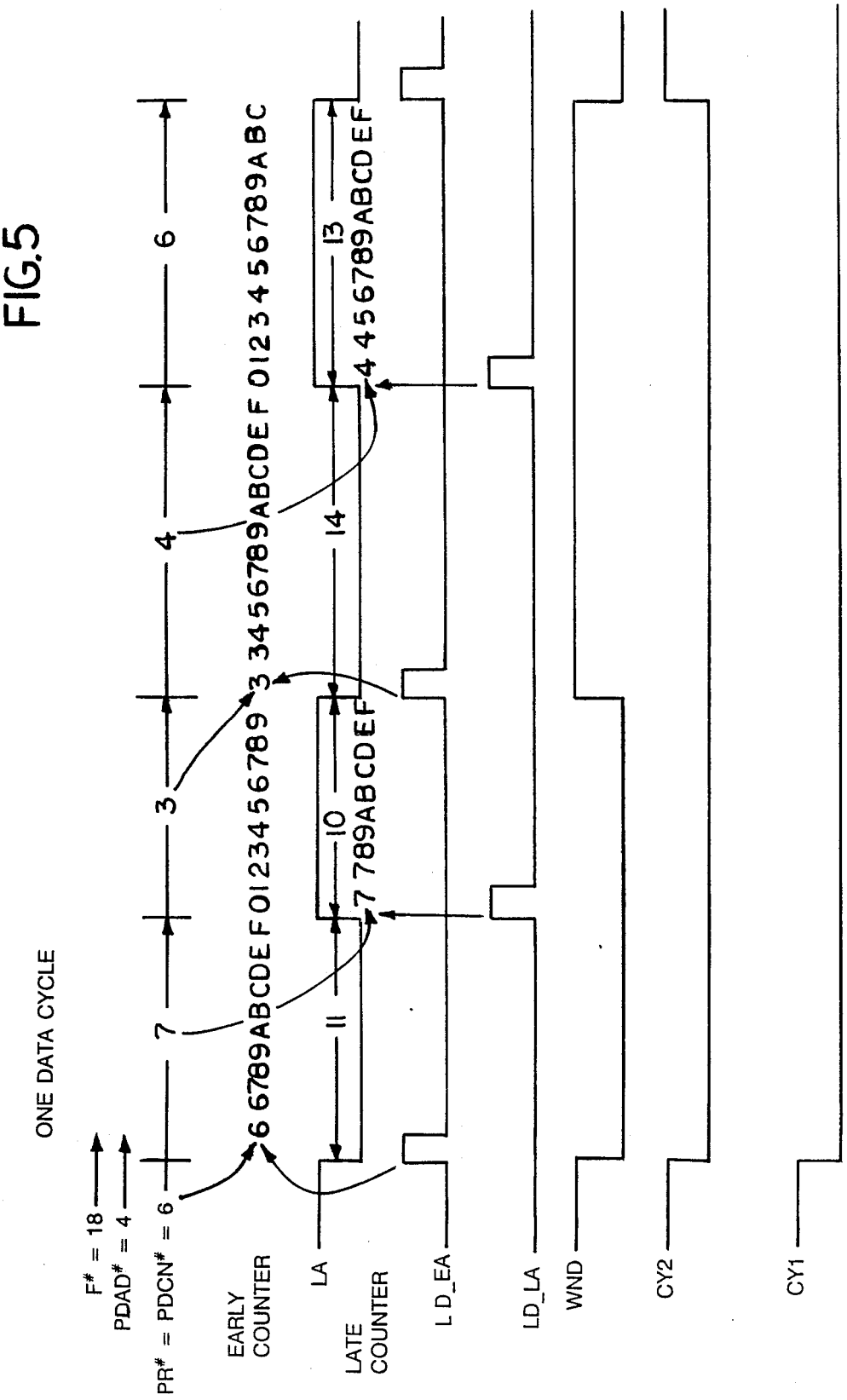
FIG. 5 is a timing diagram for a single data cycle.
Figure 6:
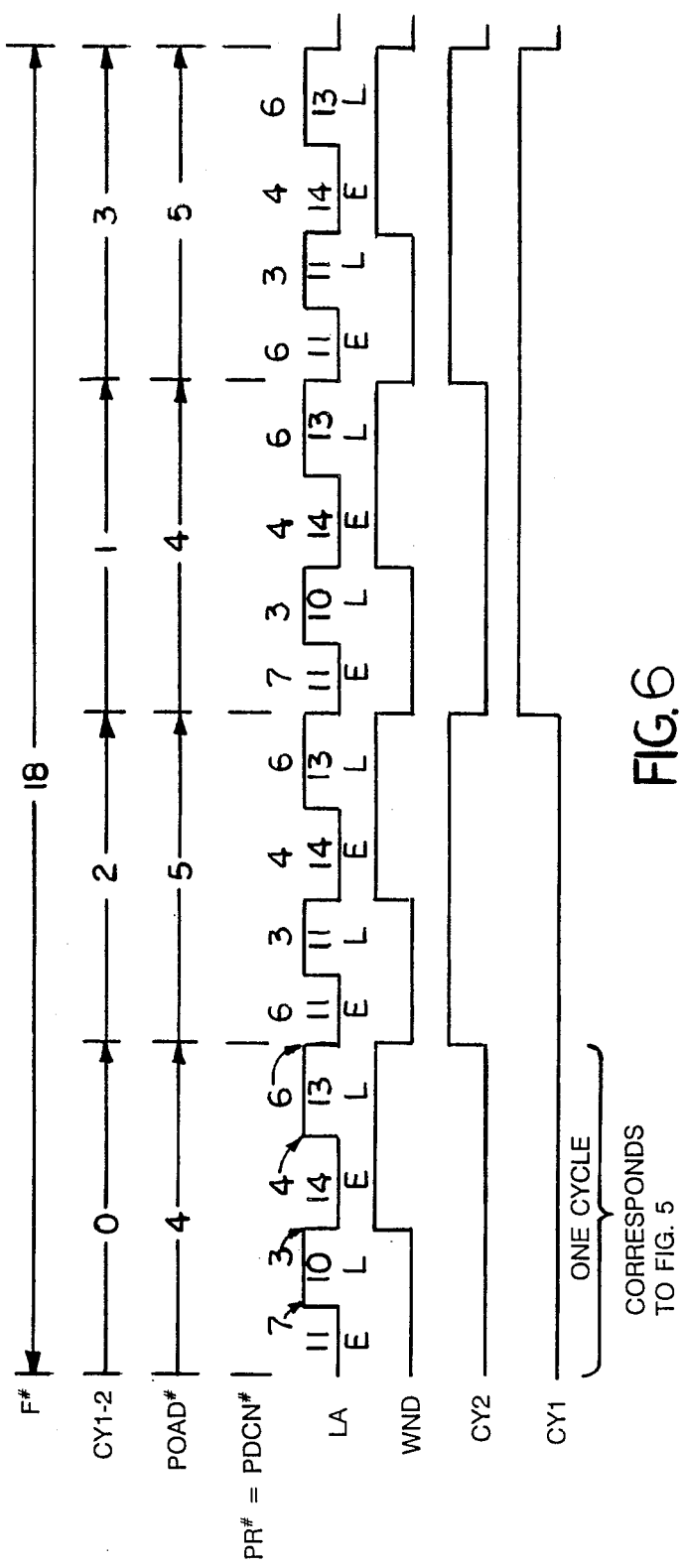
FIG. 6 is a timing diagram for four consecutive data cycles.

The operation of the frequency control generator is illustrated in FIGS. 5 and 6. This example assumes that the frequency number F# applied to adder 48 is 10010 (binary) equivalent to 18 (decimal) and remains unchanged over four data cycles. It further assumes, for the sake of illustration, that a modified phase correction number PC# is not added to the period control number PDCN# to adjust the preset number PR#. In other words, it assumes quiescent operation at frequency number 18 with no read data pulses. At the start of a data cycle, during the early period of the cycle's zero window the period number addressing the period control table 52 will be 100 (binary) or 4 since the two lowest order digits are dropped. Referring to the preceding Table 2, since both the delayed late signal DLA and the delayed window signal DWND are low, this address returns a PDC# of 7 which passes through adder 24 unchanged to become the next PR# that is loaded into late counter 20 when the early counter 18 rolls over.

As shown in FIG. 5, loading a 7 count into the late counter 20 causes the late period to become 10 clock pulses wide (i.e., it takes 10 clock pulses to load and count from 7 to 16). Shortly after the early counter rolls over, the delayed late signal DLA goes high causing a 3 (the next period control number PDCN#) to be addressed in the period control table 52. (See Table 2.) When the late counter rolls over, 3 is loaded into early counter 18 causing the early period of the 1's window to be 14 clock pulses wide (i.e., it takes 14 clock pulses to load and count up from 3 to 16). The remaining periods of a single data cycle, namely, the early and late parts of the 1's window, are similarly dependent on the state of the DLA and DWND for addressing different period control numbers stored in the period control table 52.

The signal states of FIG. 5 are repeated and carried forward in the timing diagram of FIG. 6. The CY1-2 counter, clocked by the trailing edge of DWND, adds a count of 2 to the frequency number F# (18) during the next data cycle, the low and high order bits of counter 50 being reversed as inputs to adder 48. Thus, 10010 and 00010 are summed to produce 10100 or 101 after dropping the low order bits As a consequence, the period address number PDAD# is increased from 4 to 5 which causes a different period control number to be addressed for each early and late window of the data cycle (see Table 2). The period control numbers are similarly affected in the third and fourth data cycle when 1 and 3 are added to the frequency number F# respectively. Note in this case adding 2 or 3 (or, alternately, 0 or 1) happens to yield the same PDAD# because the difference in the sum is confined to the two low order bits.

Figure 7:
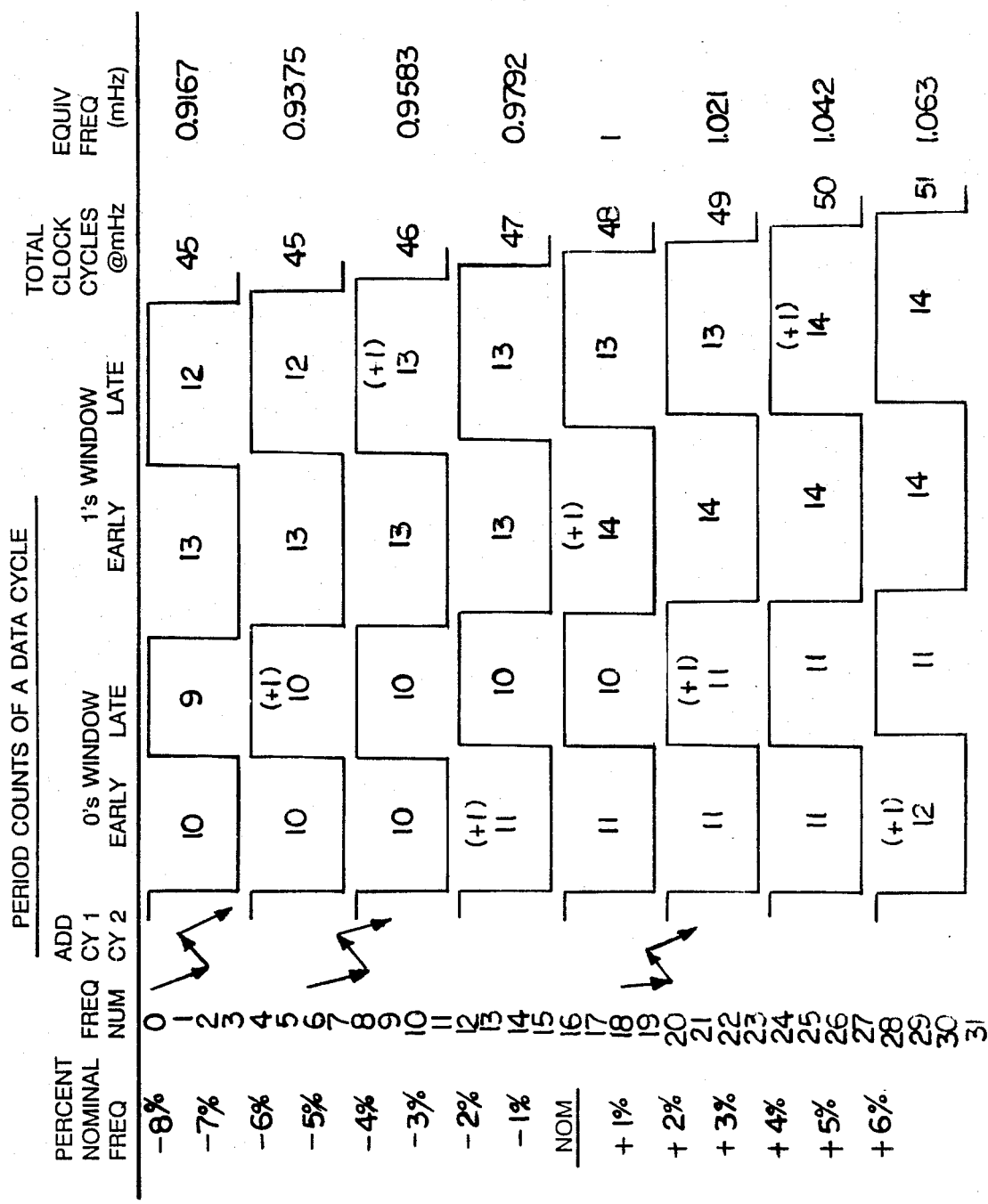
FIG. 7 is a diagram showing the relationship between frequency numbers and reference waveforms in the illustrated embodiment.

The benefit of modulating the effective F# with the CY1-2 counter over four cycles is that it provides the system with a ½% frequency resolution over 4 data cycles. As shown in FIG. 7, a clock count is added every four frequency numbers by alternately adding a clock count in the early periods and then in the late periods. The reason for staggering an additional count every four frequency numbers is to balance the 0's and 1's window as the frequency of the reference waveform increases or decreases. For example, arrows connected together in the add CY1-2 column are shown to indicate the effect of adding the output count of the CY1-2 counter 50 to the frequency number F#. Adding the CY1-2 waveforms to the frequency number of 18 over four data cycles results in two data waveforms in the 16 to 19 frequency range and two data waveforms in the 20 to 23 frequency range. The total period counts of all four data cycles is 44+45+44+45=178. If the frequency number is increased to 19 over the next four data cycles, one data cycle waveform would be in the 16 to 19 frequency range and three data cycles would be in the 20 to 23 frequency range. The total period counts for these four data cycles equals 44+45+45+45=179, which results in approximately ½% frequency resolution over the 4 data cycles.

A further illustration is provided in FIG. 8 which tabulates the commutative effect of four data cycles at neighboring frequencies modulated by CY1, 2 for the F# 12 through 16. During a quiescent mode with no read data pulses, the preset numbers PR# are determined exclusively by the period control numbers PDCN#. Phase correction numbers PC# are prevented from being added to the period control number PDCN# by the NAND gate which is controlled by the add phase correction signal ADPHCOR. In the preferred embodiment, the frequency number F# is preset to the nominal 1 MHz frequency number of 16 (FIG. 7) at register 46 by a reset signal RST2-bar. The reset signal is produced in response to a predetermined period without valid read data pulses, such as the gap between data blocks, in order to re-initialize the system.

To summarize the operation with read data pulses, a sample count (CNT_LT) is added to the previous phase remainder by adder 28 and register 32 (plus one if a late sample) and then divided by four. The resulting number passes through the phase correction table 34 unchanged or, if RD_EN_LT is set, the phase number addresses a phase correction number which may be a lower value. The output of the table, the phase correction number PC#, goes to two places: first to adder 39 to be increased by one then to adder 24 in the reference waveform generator 12 to make a one time only change in the preset number and second, to be divided by two and added to the F# by adders 40 and 44 and register 42. The relationships between the values can be stated by the following expressions.

PC# = [CNT_LT + PH_REM(+1 if LATE)]/4 of phase correction table

New F# = (PC# + F_REM)/2 + old F#

PR# = period control table-PC# + 1.

During a period with no read data pulses, the operation may be summarized as follows. In the absence of data, the RST2-bar line is strobed by the read circuitry (not shown) setting the F# latch register to 16, the nominal 1 MHz frequency number. The cycle 1 - 2 count is added to the F# and the sum is divided by 4 by virtue of the fact that only the three high order bits are used as period numbers (PD#). The period numbers in conjunction with the delayed late (DLA) and delayed 1's window (DWND) address a lookup table (period control table 52). The output of the frequency table goes straight through the adder 24 unchanged and becomes the preset number which gets loaded into either the early counter or the late counter. The load early (LD_EA) and load late (LD_LA) signals toggle the late signal (LA) while the 1's window signal (WND) is toggled by the late signal, the delayed late signal and delayed window signals being 1 clock cycle delayed.

The foregoing embodiment according to the invention implements a high resolution purely digital phase locked loop for reading magnetic media. By modulating the collective count of the reconstructed data cycle in a balanced way, the circuit achieves a higher effective resolution, equivalent (over four cycles) to using a 200 MHz clock rate to achieve ½% frequency increments for a 1 MHz data rate. In addition, by managing the phase and frequency corrections, high resolution is achieved without degrading accuracy and without making the system prone to overreaction to phase jitter. The primary benefit of all this is avoidance of linear integrated circuitry otherwise beneficial for its infinite resolution, in order to be able to fabricate a monolithic DPLL which works at least as well and possibly more reliably considering drift in linear circuitry. Indeed, a one-chip implementation for multiple channels may be feasible.

The same approach may be used or adapted for other DPLL applications besides magnetic media, such as data communications. Thus, "read data signals" should be interpreted to include received data however transmitted, read or generated.

Other embodiments are within the following claims. For example, the circuit shown in FIG. 3 can be boosted from two to one percent resolution by doubling the speed of the clock source. Since the counters are counting twice as fast and twice as much phase correction is applied to the reference waveform, generator phase correction is not affected by the speed of the clock. However, the phase correction number is now twice as large as necessary to correct changes in frequency so the output of adder 40 must be divided by 4 instead of 2.

Appendix
Signal Nomenclature

| | |
|---|---|
| WND | 0's and 1's windows, the reference waveform (block 26) (data cycle), 1's high. |
| DWND | WND delayed by 1 clock cycle (block 26) |
| LA | early/late signal (late high) (block 26) |
| DLA | LA delayed by 1 clock cycle (block 26) |
| LD_LA | load late counter line from early counter 20 |
| LD_EA | load early counter line from late counter 18 |
| CLK | 48 MHz clock |
| CNT_CLK | count clock |
| SKIP | skip count |
| SA_PLS | sample pulse (data input to register 22) |
| RD_DATA | read data signal |
| LA_LT | latched late siqnal LA (reg. 22) |
| CNT_LT | Latched count from late counter 18 (reg. 22) |
| PE# | phase error number (CNT_LT+LA_LT (reg. 22) |
| PH# | phase number (address to phase correction table 34) |
| PC# | phase correction number (phase correction table 34 output) |
| F# | frequency number (reg. 46) |
| PDAD# | period address number (address to period control table 52) |
| PDCN# | period control number (period control table 52 output) |
| PR# | preset number (adder 24) |
| RST2_bar | reset (to prime frequency register 46) |
| RD_EN_LT | read enable latch signal (phase PROM 34 control) |
| ADPHCOR | add one-time phase correction (FIG. 4) |

I claim:

1. A system for synchronizing a reference waveform with read data signals, comprising
   a frequency register,
   a frequency presetter for loading a nominal frequency number into said frequency register,
   an addressable lookup table,
   a reference signal generator for producing the timing for a reference signal having at least one time window and an early/late signal whose state indicates early and late portions of said window, the output of said frequency register in combination with said early/late signal forming an address input to said lookup table, said lookup table in response to said address input producing an output number corresponding to a predetermined time period,
   said reference signal generator determining said early and late periods in said at least one window in accordance with the corresponding outputs of said lookup table,
   a phase error generator for sampling the condition of said reference signal generator in response to a read data signal for producing a phase error signal, and
   a frequency corrector for adjusting the number in said frequency register as a function of said phase error.

2. The system of claim 1, wherein said reference signal generator includes mean for generating complementary windows each having early and late periods and producing a window signal whose state is indicative of one window or the other, said window signal in combination with the frequency register output and the early/late signal forming the address input to said lookup table.

3. The system of claim 1, wherein said reference signal generator includes a digital counter and means for counting a number of clock cycles as a function of the output of said lookup table.

4. The system of claim 1, wherein said reference signal generator includes early and late digital counters, means for enabling the late counter when the early counter has counted a predetermined number of clock pulses corresponding to a function of the output of said lookup table.

5. The system of claim 4, wherein said early and late counters are each preloaded with a number from said lookup table upon the rolling over of the other counter.

6. The system of claim 5, wherein said phase error generator includes means responsive to said early counter at a time corresponding to said read data signal for latching the output of said early counter.

7. The system of claim 1, further comprising means for combining a single one-time indication of said phase error signal to the output of said lockup table to determine the periods of said early and late portions of said window.

8. The system of claim 1, further comprising means for adding to the frequency number contained in said frequency register in each data cycle a corresponding one of a repeating sequence of numbers to modulate the frequency number.

9. A phase locked loop circuit for locking a reference waveform having at least one data window into synchronism with a sequence of read data signals, comprising
   a reference generator including an early counter for producing a loadlate signal upon reaching a predetermined count and a late counter for producing a load-early signal upon reaching a predetermined count, said late counter being set to an initial number in response to said load-late signal, said early counter being set to an initial number in response to said load-early signal,
   a phase error detector for indicating the condition of one of said counters at a time corresponding to the arrival of a read data signal, and
   means for determining the initial number preloaded into one of said counters as a function of the output of said phase error detector.

10. The system of claim 9, including means for determining the initial numbers preloaded into both counters as a function of the output of said phase error detector to determine early and late periods within said data window.

11. The system of claim 10, further comprising said determining means including a lookup table and means for presenting respective addresses to said lookup table corresponding to retrieve numbers specifying said early and late periods.

12. The system of claim 11, wherein said reference signal generator further comprises means for defining successive complementary windows each having different early and late periods specified by said lookup table.

13. A system for synchronizing a reference signal waveform with read data signals, comprising
   a reference signal generator for producing the timing for a reference signal with variable phase and frequency,
   a phase error detector for producing a phase error signal indicative of the condition of said reference signal at a time corresponding to the occurrence of a read data signal,
   a frequency number signal,
   means for preloading a nominal frequency number in said frequency number register,
   a period lookup table, means for presenting an address to said lookup table at least in part dependent on said frequency number, said reference signal generator being responsive to the output of said lookup table for determining the period of at least a portion of the reference signal, a phase lookup table, at least a portion of said phase error signal being used to address said phase lookup table, the output of said phase lookup table forming a portion of the address for said period lookup table, means for combining the output of said phase lookup table with the output of said period lookup table to generate a number indicative of the period of at least a portion of said reference signal, said reference signal generator generating the timing for said reference signal in accordance with the number produced by said lookup table output combining means.

14. The system of claim 13 further comprising means for inhibiting said combining means from combining the output of said phase table except over a predetermined number of cycles.

15. The system of claim 14, wherein said predetermined number of cycles is not more than one cycle.

16. A subsystem for setting the frequency of a reference signal waveform in a system for synchronizing a reference signal waveform with read data signals, comprising a reference signal generator for generating the timing for a first reference signal comprising a repeating data cycle of ones and zero windows each having early and late periods, and a second reference signal comprising a repeating data cycle of ones and zeros corresponding to said early and late periods, a frequency number register, a frequency presetter for loading a nominal frequency number into said frequency number register, a period lookup table, means for addressing said period lookup table by combining the output of the frequency number register with said first and second reference signals indicating which period of which window the reference signal is currently in, said reference signal generator determining the periods of said early and later periods of each window in accordance with the corresponding output of said lookup table.

17. The system of claim 16, further comprising means for adding to the output of said frequency number register in successive data cycles successive numbers in a repeating sequence of numbers.

18. The system of claim 17, wherein n consecutive frequency numbers produce the same set of outputs from one data cycle to the next, there being n numbers in said repeating sequence.

19. The system of claim 18, wherein said repeating sequence is composed of staggered pairs of lower and higher numbers.

20. The system of claim 19, wherein n is 4 and said repeating sequence of numbers corresponds to the numbers 0, 2, 1, 3.

* * * * *

UNITED STATES PATENT AND TRADEMARK OFFICE
CERTIFICATE OF CORRECTION

PATENT NO. : 4,975,930

DATED : December 4, 1990

INVENTOR(S) : Shaw

It is certified that error appears in the above-identified patent and that said Letters Patent is hereby corrected as shown below:

Column 1, lines 54 & 57; "subseguent" should be
--subsequent--

Column 2, line 14; insert --.-- after "capacitor"

Column 2, line 49; "P#" should be --PE#--

Column 4, line 9; insert --.-- after "rate"

Column 4, line 56; insert --.-- after "window"

Column 4, lines 64 & 65; "subseguent" should be
--subsequent--

Column 5, line 1; insert --.-- after "12"

Column 5, line 28; insert --.-- after "diagrams"

Column 6, line 21; insert --.-- after "late" and
"thus" should be --Thus,--

Column 9, line 10; insert --.-- after "bits"

UNITED STATES PATENT AND TRADEMARK OFFICE
CERTIFICATE OF CORRECTION

PATENT NO. : 4,975,930

DATED : December 4, 1990

INVENTOR(S) : Shaw

It is certified that error appears in the above-identified patent and that said Letters Patent is hereby corrected as shown below:

Column 12, line 27: "loadlate" should be --load-late--.

Signed and Sealed this

Sixteenth Day of March, 1993

Attest:

STEPHEN G. KUNIN

*Attesting Officer*  Acting Commissioner of Patents and Trademarks